United States Patent
Phanse

(10) Patent No.: US 7,139,342 B1
(45) Date of Patent: Nov. 21, 2006

(54) SYSTEM AND METHOD FOR CANCELLING SIGNAL ECHOES IN A FULL-DUPLEX TRANSCEIVER FRONT END

(75) Inventor: Abhijit M. Phanse, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/569,957

(22) Filed: May 12, 2000

(51) Int. Cl.
*H04B 1/10* (2006.01)

(52) U.S. Cl. ............................ 375/350; 379/406.08

(58) Field of Classification Search ............ 375/219, 375/220, 346, 350; 379/388.07, 398, 403, 379/404, 417, 406.1, 406.08, 406.06
See application file for complete search history.

(56) References Cited

U.S. PATENT DOCUMENTS

| | | | |
|---|---|---|---|
| 4,568,917 A | * | 2/1986 | McKenzie et al. .......... 341/118 |
| 4,928,308 A | * | 5/1990 | Roessler ................. 379/406.08 |
| 5,034,978 A | * | 7/1991 | Nguyen et al. .............. 379/402 |
| 5,790,657 A | * | 8/1998 | Fujiwara ................. 379/406.07 |
| 6,078,567 A | * | 6/2000 | Traill et al. .................. 370/289 |

* cited by examiner

*Primary Examiner*—Kevin Kim

(57) ABSTRACT

There is disclosed an echo canceller circuit for use in a full duplex transceiver of the type comprising a line driver capable of sending analog transmit signals through a cable and comprising a line receiver capable of receiving analog receive signals from the cable. An echo canceller impedance model circuit is coupled to an output of the line driver and is coupled to an input of the line receiver. The echo canceller impedance model circuit generates an echo canceller current that is equal in magnitude and opposite in phase to a current that represents signal echoes that are present in the analog receive signals. The echo canceller impedance model circuit has a variable impedance for generating the echo canceller current. The variable impedance has at least one variable resistor and at least one variable capacitor. The values of resistance and capacitance in the echo canceller impedance model circuit are varied in response to control signals from a echo canceller control circuit to compensate for and cancel signal echoes.

22 Claims, 6 Drawing Sheets

SYSTEM AND METHOD FOR CANCELLING SIGNAL ECHOES IN A FULL-DUPLEX TRANSCEIVER FRONT END

The present invention is related to those disclosed in the following United States Patent Applications:

1. Ser. No. 09/570,076, filed concurrently herewith, entitled "FULL DUPLEX GIGABIT-RATE TRANSCEIVER FRONT-END AND METHOD OF OPERATION;"
2. Ser. No. 09/570,331, filed concurrently herewith, entitled "SYSTEM AND METHOD FOR MIXED MODE EQUALIZATION OF SIGNALS;"
3. Ser. No. 09/570,077, filed concurrently herewith, entitled "DIGITALLY CONTROLLED AUTOMATIC GAIN CONTROL SYSTEM FOR USE IN AN ANALOG FRONT END OF A RECEIVER;"
4. Ser. No. 09/569,828, filed concurrently herewith, entitled "SYSTEM AND METHOD FOR CORRECTING OFFSETS IN AN ANALOG RECEIVER FRONT END;"
5. Ser. No. 09/569,518, filed concurrently herewith, entitled "RECEIVER ARCHITECTURE USING MIXED ANALOG AND DIGITAL SIGNAL PROCESSING AND METHOD OF OPERATION;" and
6. Ser. No. 09/570,078, filed concurrently herewith, entitled "SYSTEM AND METHOD FOR ADAPTING AN ANALOG ECHO CANCELLER IN A TRANSCEIVER FRONT END."

TECHNICAL FIELD OF THE INVENTION

The present invention is generally directed to transceivers for sending and receiving analog signals and, more specifically, to a system and method for cancelling signal echoes in a full-duplex transceiver front end.

BACKGROUND OF THE INVENTION

In a full duplex transceiver analog signals are simultaneously transmitted and received on a cable. For example, Gigabit Ethernet transceivers simultaneously transmit and receive analog signals over twisted pair category 5 copper cable. In full duplex operation the receive signal contains both the signal from the remote end transmitter and the signal from the local transmitter. The signal from the local transmitter is referred to as echo. In order to correctly recover the data from the remote end transmitter in the receive signal it is necessary to cancel the echo in the receive signal. This task may be accomplished with an echo canceller circuit.

An echo canceller circuit works on the principle of subtracting an estimate of the transmit signal from the full duplex signal. The full duplex signal that reaches the receiver comprises the receive signal plus echo signals from the transmit signal. An echo canceller circuit provides a copy of the transmit signal to the receiver portion of the transceiver so that the receiver can subtract the transmit signal from the full duplex signal.

Analog echo cancellation is very important. Analog echo cancellation provides a large amount of echo cancellation. This reduces the complexity and the size of any digital echo canceller that may be used to obtain additional echo cancellation after the analog signals are converted to digital signals. More importantly, analog echo cancellation produces a high signal to echo ration at the input of an analog to digital converter (ADC). This means that the receive signal can be boosted before entering the ADC without saturating the ADC. This additional boost leads to less quantization noise and a higher signal to noise ratio (SNR). In this manner, good analog echo cancellation can significantly improve the bit error rate and cable length performance of the transceiver.

The transmit signal that is actually placed on the cable by the local transmitter of the transceiver (and therefore the echo) depends upon the impedance that is presented to the integrated circuit (IC) that contains the transmitter of the transceiver. The impedance that is presented to the IC is made up of a number of elements including the impedance of the cable, the z11 impedance of the transformer that couples the cable to the transceiver front end, the impedance of the IC on-board traces, and the impedance of the IC input/output (I/O) structures such electrostatic discharge protectors, I/O cells, and the like. The effective impedance that is presented to the IC will vary depending upon the variations within these components and the manufacturing tolerances within these components.

There is therefore a need in the art for an improved echo canceller circuit that is capable of taking into account the actual external impedance that is encountered by a transmit signal in a full duplex transceiver.

SUMMARY OF THE INVENTION

The echo canceller circuit of the present invention has the ability to measure and replicate the effective external impedance that is presented to the transmit signal of a transceiver. Therefore, the echo canceller circuit of the present invention is able to more perfectly estimate the transmit signal that is actually transmitted by the transceiver.

Because the echo canceller circuit of the present invention can replicate the effective external impedance (and estimate the actual transmit signal), it can cancel signal echoes from the transmit signal with greater precision than that of prior art echo canceller circuits.

The echo canceller circuit of the present invention is designed to be used in a full duplex transceiver of the type comprising a line driver capable of sending analog transmit signals through a cable and comprising a line receiver capable of receiving analog receive signals from the cable. An echo canceller impedance model circuit is coupled to an output of the line driver and is coupled to an input of the line receiver.

The echo canceller impedance model circuit generates an echo canceller current that is equal in magnitude and opposite in phase to a current that represents the signal echoes that are present in the full duplex signal. The echo canceller impedance model circuit has a variable impedance for generating said echo canceller current. The variable impedance has at least one variable resistor and at least one variable capacitor. The values of resistance and capacitance in the echo canceller impedance model circuit are varied in response to control signals from a echo canceller control circuit to compensate for and cancel signal echoes. In some types of full duplex transceivers the echo canceller circuit of the present invention is capable of providing from eighteen (18) to twenty (20) decibels (dB) of echo rejection.

It is a primary object of the present invention to provide an echo canceller circuit that measures and replicates the effective external impedance that is presented to the transmit signal of a transceiver.

It is another object of the present invention to provide an improved echo canceller circuit that compensates for the variations and manufacturing tolerances of various components within the transceiver that affect the effective external impedance that is presented to the transmit signal of a transceiver.

It is another object of the present invention to provide a system and method for cancelling signal echoes in a full-duplex transceiver front end.

It is another object of the present invention to provide an improved echo canceller circuit for cancelling signal echoes in a full-duplex transceiver front end.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OR THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged echo canceller in a full duplex transceiver.

Figure 1:
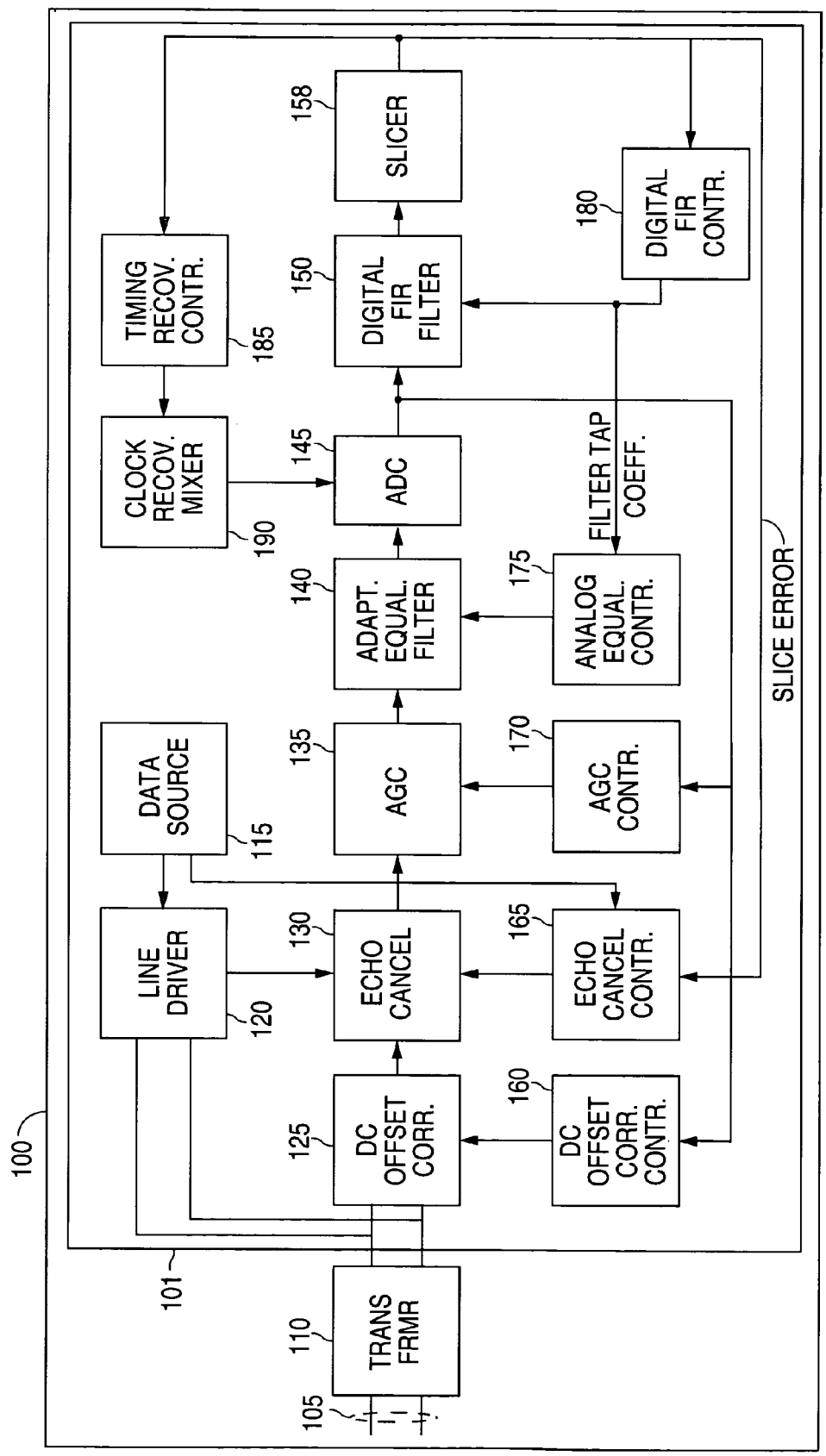
FIG. 1 illustrates a block diagram of a front end of an exemplary full duplex transceiver showing the location within the full duplex transceiver of an echo canceller according to one embodiment of the present invention.

FIG. 1 illustrates a block diagram of the front end of an exemplary full duplex transceiver 100. Full duplex transceiver 100 simultaneously transmits and receives analog signals through cable 105. Cable 105 may be a copper twisted pair cable. Cable 105 is coupled to transformer 110. Transformer 110 receives analog data signals from data source 115 through line driver 120 and transfers the analog data signals to cable 105 for transmission. Transformer 110 also receives analog data signals from cable 105 and transfers them to DC offset correction circuit 125.

DC offset correction circuit 125 receives incoming analog data signals from transformer 110 and adjusts the incoming analog data signals by providing an offset signal that cancels the systematic offset that accrues during the operation of transceiver 100. DC offset correction circuit 125 then transfers the incoming analog data signals to echo canceller 130.

The analog data signals that echo canceller 130 receives from DC offset correction circuit 125 contain echoes of the transmit signal that transformer 110 transfers to cable 105 from line driver 120. The task of echo canceller 130 is to remove the echoes of the transmit signal from the analog data signal that echo canceller 130 receives from DC offset correction circuit 125. In an alternate embodiment of full duplex transceiver 100, DC offset correction circuit 125 is not present and echo canceller 130 removes the echoes of the transmit signal from the analog data signal that echo canceller 130 receives from transformer 110.

To enable echo canceller 130 to remove the echoes of the transmit signal, line driver circuit 120 transfers a copy of the transmit signal to echo canceller 130. Line driver circuit 120 transfers the copy of the transmit signal to echo canceller 130 at the same time that line driver circuit 120 transfers the transmit signal to transformer 110. As will be more fully described, echo canceller 130 utilizes information concerning the transmit signal to cancel out the echoes of the transmit signal from the analog data signals that echo canceller 130 receives.

After echo canceller 130 cancels out echoes of the transmit signal, echo canceller 130 transfers the analog data signals to automatic gain control (AGC) circuit 135. After AGC circuit 135 automatically adjusts the gain of the analog data signals, AGC circuit 135 transfers the analog data signals to adaptive equalization filter 140.

Adaptive equalization filter 140 is used to provide signal equalization. Adaptive equalization filter 140 provides a high frequency boost to complement the analog data signal loss in cable 105. The amount of the high frequency boost provided by adaptive equalization filter 140 is adapted to the length of cable 105. Adaptive equalization filter 140 then transfers the filtered analog data signals to analog-to-digital converter (ADC) 145 where the filtered analog data signals are converted to digital signals.

Digital signals from ADC 145 are transferred to a digital finite impulse response (FIR) filter 150 and to data slicer circuit 155. Data slicer circuit 155 determines error in the digital signals and transfers the error to echo canceller control circuit 165. Echo canceller control circuit 165 sends control signals to echo canceller 130. As will be more fully explained below, in response to these control signals echo canceller 130 automatically adjusts the values of certain circuit components to cause signal echoes to be cancelled.

Other control circuits in full duplex transceiver 100 include DC offset correction control circuit 160, AGC control circuit 170, and analog equalization control circuit 175. Digital FIR control circuit 180 is provided to provide FIR tap coefficients to digital FIR filter 150 and to analog equalization control circuit 175. Lastly, timing recovery control circuit 185 receives error signals from slicer circuit 155 to provide frequency adjustments to clock recovery mixer 190 to adjust the phase and frequency of the clock of ADC 145.

Figure 2:
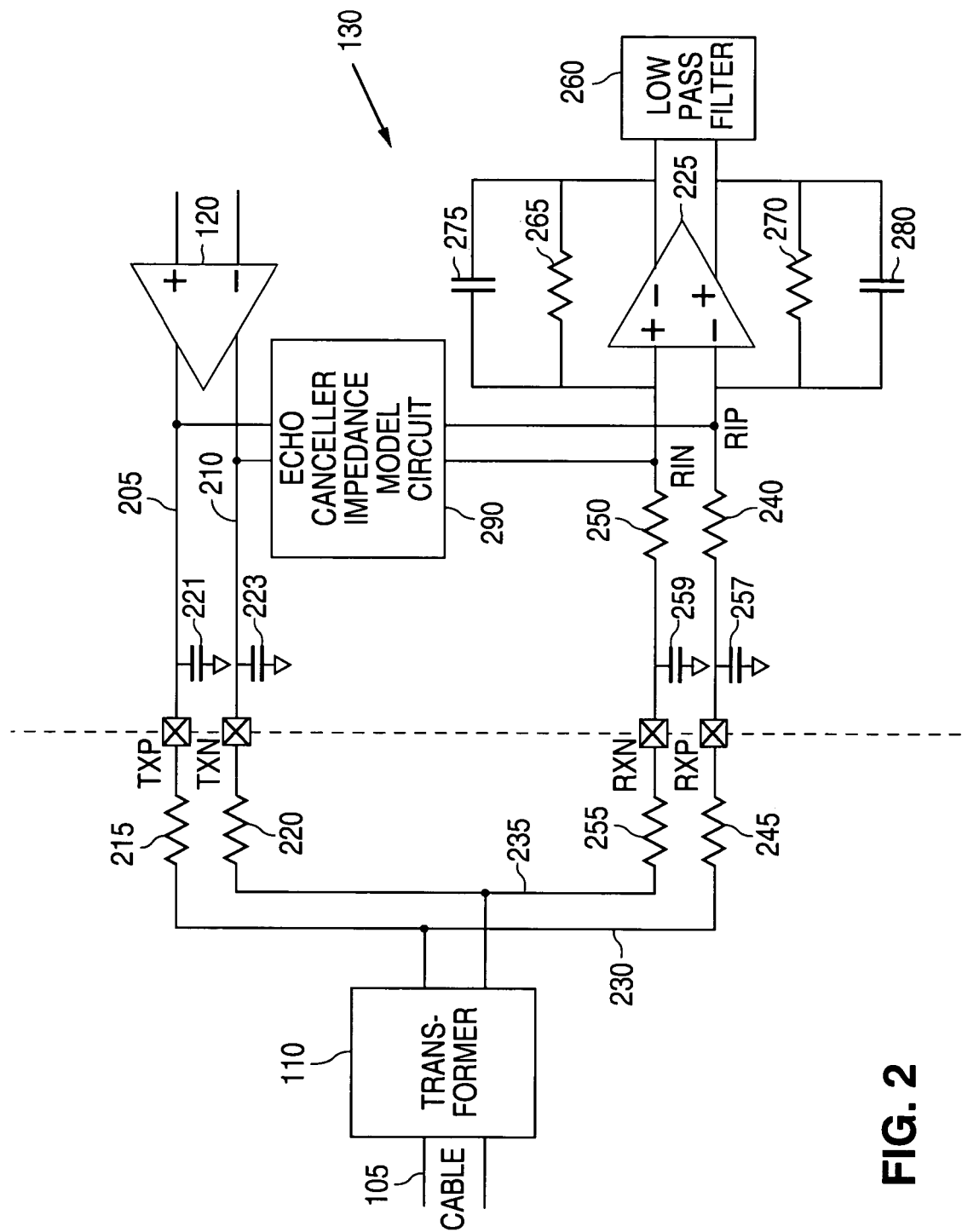
FIG. 2 illustrates how the echo canceller according to one embodiment of the present invention is coupled to the transmit path and to the receive path of the full duplex transceiver.

FIG. 2 illustrates a more detailed view of echo canceller 130 of the present invention showing how echo canceller 130 is coupled to the transmit path and the receive path of full duplex transceiver 100. DC offset correction circuit 125 is not present in the embodiment shown in FIG. 2. Line driver 120 is coupled to transformer 110 by first signal line 205 and by second signal line 210. First signal line 205 connects the positive output terminal of line driver 120 to transformer 110 through off-chip termination point TXP and through resistor 215. Resistor 215 has a value of resistance equal to one half the resistance of cable 105. Because the resistance of cable 105 is typically one hundred ohms (100Ω) the typical value of resistor 215 is fifty ohms (50Ω). Similarly, second signal line 210 connects the negative output terminal of line driver 120 to transformer 110 through off-chip termination point TXN and through resistor 220. Resistor 220 also has a value equal to one half the resistance of cable 105. Because the resistance of cable 105 is typically one hundred ohms (100Ω) the typical value of resistor 220 is fifty ohms (50Ω). Line driver 120 transfers the transmit signal to transformer 110 via first signal line 205 and second signal line 210.

Off-chip termination point TXP and off-chip termination point TXN mark the boundary between the integrated circuit (IC) chip and the off-chip circuitry of echo canceller 130. The chip boundary is represented in FIG. 2 by a dotted line drawn through the off-chip termination points TXP and TXN. Circuit elements to the right of the dotted line are on the IC chip. Circuit elements that are to the left of the dotted line are not on the IC chip. First signal line 205 passes through the chip boundary at off-chip termination point TXP. Second signal line 210 passes through the chip boundary at off-chip termination point TXN.

Capacitors 221 and 223 are provided on the IC chip for electrostatic discharge (esd) protection. Capacitors 221 and 223 have a value of capacitance of Cesd (with a typical value of ten picofarads (10 pF)). As shown in FIG. 2, capacitor 221 is coupled in parallel with first signal line 205 on the IC chip just to the right of off-chip termination point TXP. Capacitor 223 is coupled in parallel with second signal line 210 on the IC chip just to the right of off-chip termination point TXN.

Echo canceller 130 comprises line receiver 225 that is coupled to transformer 110 by third signal line 230 and by fourth signal line 235. Third signal line 230 connects the negative input terminal of line receiver 225 to transformer 110 through resistor 240 that has a value of resistance R1 (with a typical value of two thousand ohms (2000Ω)) and through off-chip termination point RXP and through resistor 245 that has a value of resistance of Rs (with a typical value of one hundred fifty ohms (150Ω). Third signal line 230 is coupled to first signal line 205 at a common input to transformer 110.

Fourth signal line 235 connects the positive terminal of line receiver 225 to transformer 110 through resistor 250 that has a value of resistance R1 (with a typical value of two thousand ohms (2000Ω)) and through off-chip termination point RXN and through resistor 255 that has a value of resistance Rs (with a typical value of one hundred fifty ohms (150Ω)). Fourth signal line 235 is coupled to second signal line 210 at a common input to transformer 110.

Off-chip termination point RXN and off-chip termination point RXP mark the boundary between the IC chip and the off-chip circuitry of echo canceller 130. The chip boundary is represented in FIG. 2 by a dotted line drawn through the off-chip termination points TXP and TXN and continued through the off-chip termination points RXN and RXP. As previously mentioned, circuit elements to the right of the dotted line are on the IC chip and circuit elements that are to the left of the dotted line are not on the IC chip. Third signal line 230 passes through the chip boundary at off-chip termination point RXP. Fourth signal line 235 passes through the chip boundary at off-chip termination point RXN.

Capacitors 257 and 259 are provided on the IC chip for electrostatic discharge (esd) protection. Capacitors 257 and 259 have a value of capacitance of Cesd (with a typical value of ten picofarads (10 pF)). As shown in FIG. 2, capacitor 257 is coupled in parallel with third signal line 230 on the IC chip just to the right of off-chip termination point RXP. Capacitor 259 is coupled in parallel with fourth signal line 235 on the IC chip just to the right of off-chip termination point RXN.

The positive and negative output terminals of line receiver 225 are coupled to low pass filter 260. Line receiver 225 transfers the signals that it receives to low pass filter 260. As will be more fully described, low pass filter 260 attenuates high frequency echoes that remain after the signal has passed through echo canceller 130.

The positive input terminal of line receiver 225 and the negative output terminal of line receiver 225 are coupled in parallel with resistor 265. Resistor 265 has a value of resistance of R2 (with a typical value of two thousand ohms (2000Ω)). The negative input terminal of line receiver 225 and the positive output terminal of line receiver 225 are coupled in parallel with resistor 270. Resistor 270 has a value of resistance of R2 (with a typical value of two thousand ohms (2000Ω)). An optional capacitor 275 may be placed in parallel with resistor 265 and an optional capacitor 280 may be placed in parallel with resistor 270.

Echo canceller 130 also comprises echo canceller impedance model circuit 290 referred to as model circuit 290. The purpose of model circuit 290 is to automatically provide echo cancelling signals that will compensate for and cancel signal echoes that are due to transformer magnetics, cable impedance, circuit board parasitic signals, and other similar causes.

Figure 3:
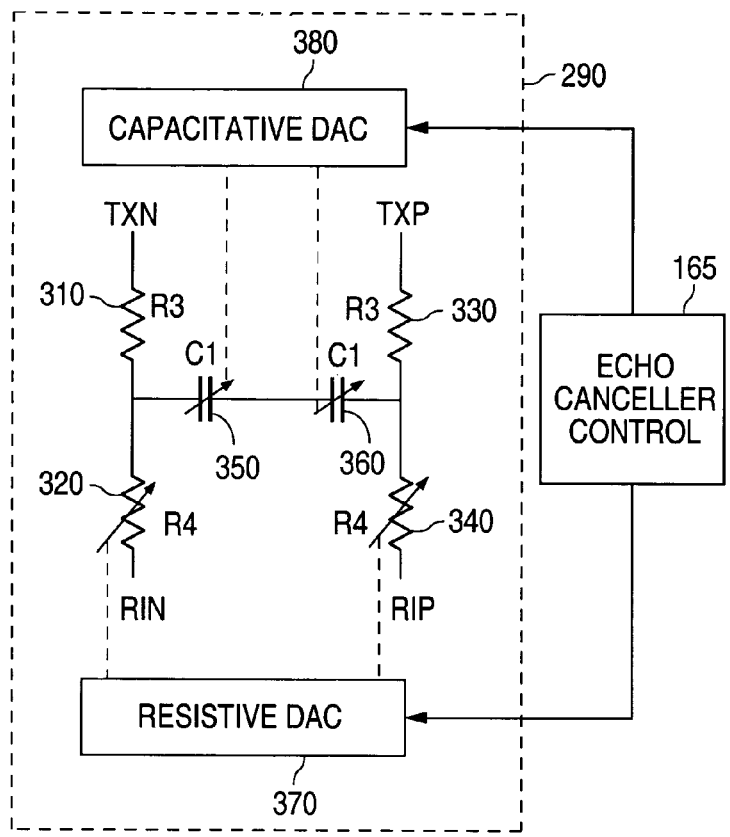
FIG. 3 illustrates a circuit diagram showing the circuitry of the echo canceller impedance model circuit according to one embodiment of the present invention.

As shown in FIG. 2, model circuit 290 is coupled to (a) first signal line 205 at TXP, and to (b) second signal line 210 at TXN, and to (c) third signal line 230 at the negative input of line receiver 225 (at a point identified as RIP), and to (d) fourth signal line 235 at the positive input of line receiver 225 (at a point identified as RIN). The circuitry of model circuit 290 is shown in FIG. 3.

A first branch of model circuit 290 comprises resistor 310. Resistor 310 has a value of resistance of R3 (with a typical value of five hundred ohms (500Ω)) coupled in series with variable resistor 320. Variable resistor 320 has a value of resistance of R4 (with a typical central value of three thousand eight hundred fifty (3850Ω)). Resistor 310 is coupled to second signal line 210 at TXN and variable resistor 320 is coupled to fourth signal line 235 at RIN.

A second branch of model circuit 290 comprises resistor 330. Resistor 330 has a value of resistance of R3 (with a typical value of five hundred ohms (500Ω)) coupled in series with variable resistor 340. Variable resistor 340 has a value of resistance of R4 (with a typical central value of three thousand eight hundred fifty (3850Ω)). Resistor 330 is coupled to first signal line 205 at TXP and variable resistor 340 is coupled to third signal line 230 at RIP.

A third branch of model circuit 290 comprises variable capacitor 350 coupled in series with variable capacitor 360. Variable capacitor 350 has a value of capacitance of C1 (with a typical central value of 3.3 picofarads). Variable capacitor 360 has a value of capacitance of C1 (with a typical central value of 3.3 picofarads). Variable capacitor 350 is coupled to the first branch of model circuit 290 between resistor 310 and variable resistor 320. Variable capacitor 360 is coupled to the second branch of model circuit 290 between resistor 330 and variable resistor 340.

Resistive digital-to-analog converter (DAC) 370 is coupled to the tuning mechanism of variable resistors, 320 and 340. The tuning mechanism of the variable resistors, 320 and 340, is schematically represented in FIG. 3 by arrows on the resistors. Resistive DAC 370 is coupled to the tuning mechanism of variable resistors, 320 and 340, in parallel (i.e., in a "ganged" connection). This means that tuning one of the variable resistors immediately causes the other variable resistor to be tuned by the same amount. The parallel or "ganged" connection is schematically represented in FIG. 3 by parallel dotted lines. Resistive DAC 370 receives control signal for the variable resistors, 320 and 340, from echo canceller control circuit 165.

Similarly, capacitive digital-to-analog converter (DAC) 380 is coupled to the tuning mechanism of variable capacitors, 350 and 360. The tuning mechanism of the variable capacitors, 350 and 360, is schematically represented in FIG. 3 by arrows on the capacitors. Capacitive DAC 380 is coupled to the tuning mechanism of variable capacitors, 350 and 360, in parallel (i.e., in a "ganged" connection). This means that tuning one of the variable capacitors immediately causes the other variable capacitor to be tuned by the same amount. The parallel or "ganged" connection is schematically represented in FIG. 3 by parallel dotted lines. Capacitive DAC 380 receives control signal for the variable capacitors, 350 and 360, from echo canceller control circuit 165.

Figure 4:
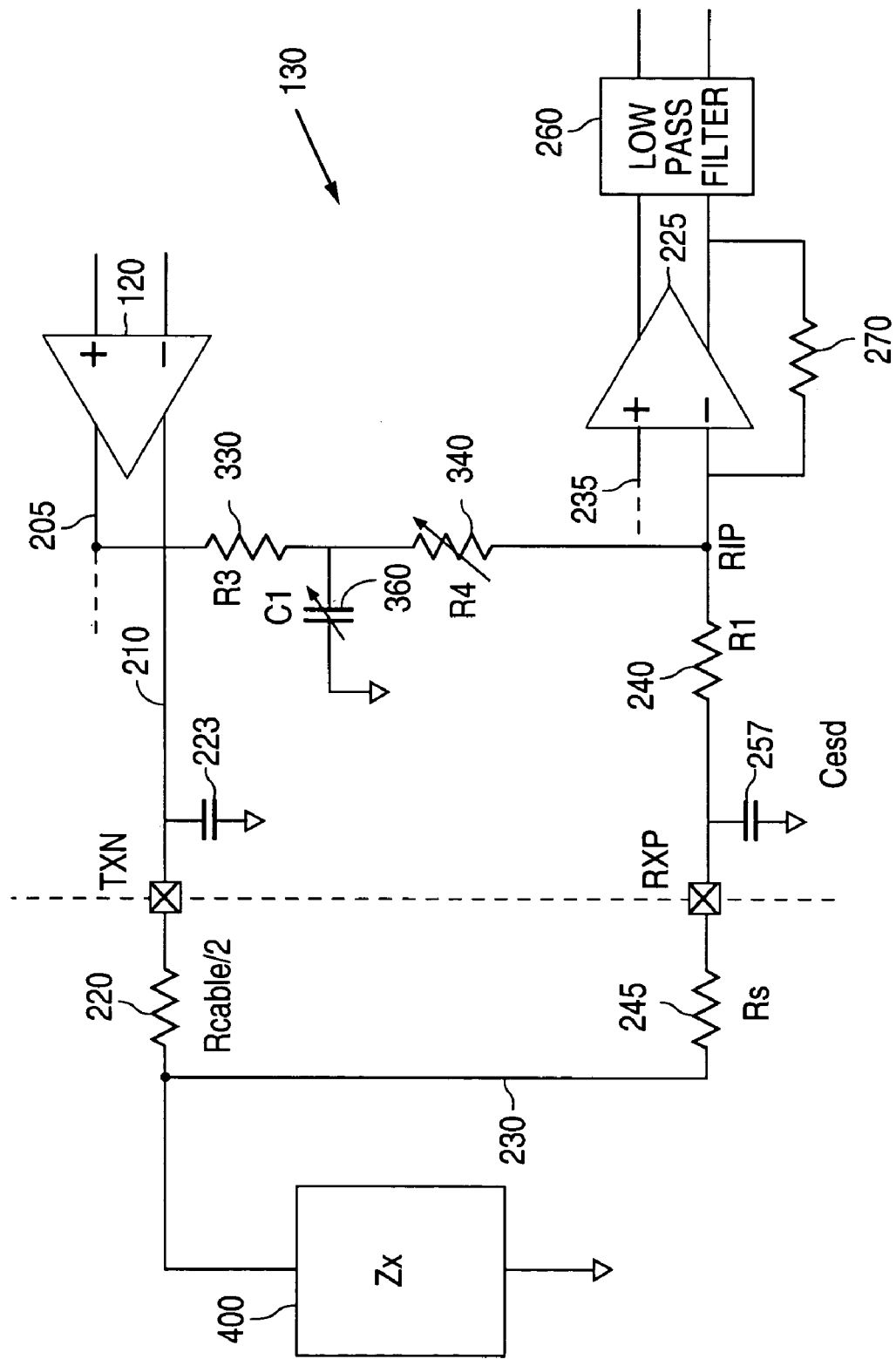
FIG. 4 illustrates a more detailed view of the echo canceller according to one embodiment of the present invention showing the connection of one branch of the echo canceller impedance model circuit to two of the signal lines of the full duplex transceiver.

FIG. 4 illustrates a more detailed view of echo canceller 130. FIG. 4 illustrates the operation of the second branch of model circuit 290 that is connected between first signal line 205 and third signal line 230. The first branch of model circuit 290 that is connected between second signal line 210 and fourth signal line 235 operates in a similar manner.

The current that represents the echo signal is referred to as iECHO. The current iECHO passes through resistor 240 in third signal line 230 to the point identified as RIP. The current that represents the echo canceller signal is referred to as iECHOCANCEL. The current iECHOCANCEL passes through resistor 340 in the second branch of model circuit 290 to the point identified as RIP. The current iECHOCANCEL is equal to the current iECHO but is pi (π) radians (or 180°) out of phase with it. The current iECHOCANCEL cancels the current iECHO at the point RIP. The echo components in the receive signal are cancelled before the signal reaches the input of line receiver 225.

In order to calculate the magnitude of the currents, it is first necessary to obtain the impedance Zx of the combination of cable 105 and transformer 110. The impedance Zx of the combination of cable 105 and transformer 110 is represented in FIG. 4 by block 400. The impedance Zx of the combination of cable 105 and transformer 110 may be modeled with the equation:

$$Z_x = Z_0[(1+s/Z_1)/[(1+s/p_1)(1+s/p_2)]] \quad (1)$$

where $Z_0$ equals one half the impedance of cable 105, $Z_1$ equals a zero of the transfer function of the combination of transformer 110 and cable 105, $p_1$ equals a first pole of the transfer function, $p_2$ equals a second pole of the transfer function, and s equals j (the imaginary unit that is equal to the square root of minus one) times $\omega_0$ (the frequency in radians).

Figure 5:
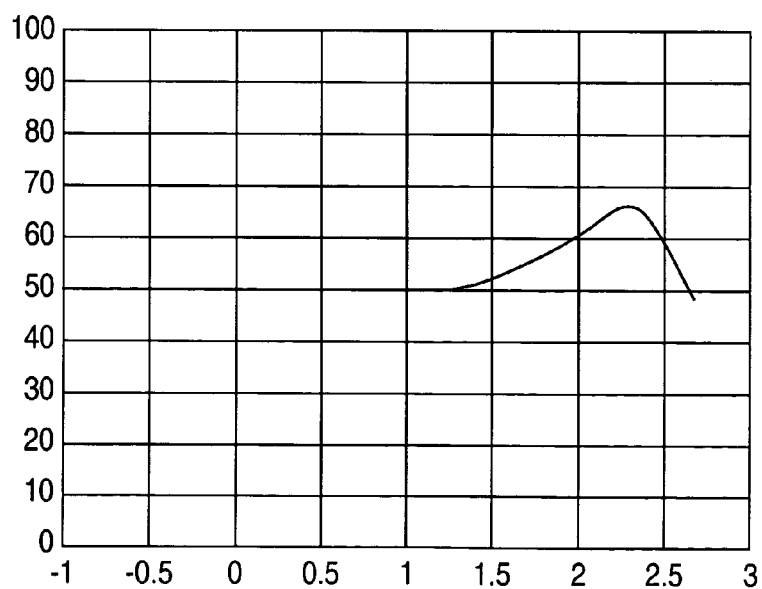
FIG. 5 is a graph that shows the values of the impedance of the combination of the cable and the transformer as a function of frequency.

As an illustrative example, FIG. 5 shows the values of impedance Zx as a function of frequency for the following values: $f_0$ equals the frequency, $Z_0$ equals fifty ohms (50Ω), $Z_1$ equals $2\pi$ times 100 times $10^6$, $p_1$ equals $2\pi$ times 200 times $10^6$, $p_1$ equals $2\pi$ times 300 times $10^6$. In FIG. 5 the ordinate of the graph is in units of ohms and the value ranges from zero (0) ohms to one hundred (100) ohms. The abscissa of the graph is in units of $\log_{10}(f_0/10^6)$ and the value ranges from minus one (−1) to three (3). For $f_0$ equal to one Megahertz (1 MHz), the abscissa value is zero because $\log_{10}(1.0 \times 10^6/10^6)$ equals zero. Similarly, the abscissa value is equal to minus one (−1) for 100 kilohertz (100 kHz), and is equal to one (1) for ten Megahertz (10 MHz), and is equal to two (2) for one hundred Megahertz (100 MHz), and is equal to three (3) for one Gigahertz (1 Ghz). Therefore, the range of the values of the abscissa of the graph is from 100 kilohertz (100 kHz) to one Gigahertz (1 GHz). The graph in FIG. 5 shows that the impedance Zx of the combination of cable 105 and transformer 110 has a maximum at a frequency where $\log_{10}(f_0/10^6)$ approximately equals 2.3. This corresponds to a frequency of approximately two hundred Megahertz (200.0 MHz).

The impedance Zi of the circuit branch comprising resistor 245 with value Rs and capacitor 257 with value Cesd and resistor 240 with value R1 may be modeled with the equation:

$$Z_i = R_S + [R1/(1+sR1C_{esd})] \quad (2)$$

where Rs equals the value of resistor 245, R1 equals the value of resistor 240, Cesd equals the value of capacitor 257, and s equals j (the imaginary unit that is equal to the square root of minus one) times $\omega_0$ (the frequency in radians).

The current iECHO that passes through the circuit branch comprising resistor 245 with value Rs and capacitor 257 with value Cesd and resistor 240 with value R1 may be modeled with the equation:

$$i_{ECHO}=(A)(B)[(Zi\|Zx)/((R_{cable}/2)+(Zi\|Zx))] \quad (3)$$

where $A=(1/(R1+R_S))$ and $B=(1/[1+sC_{esd}(R1R_S)(R1+R_S)])$ and where Zi and Zx have the previously described values of impedance, and where the terms $(R_{CABLE})/2$, R1, Rs, Cesd, and s have the previously described definitions. The term Zi‖Zx refers to the total impedance of the terms Zi and Zx in parallel. That is, Zi‖Zx equals the product of Zi and Zx divided by the sum of Zi and Zx.

The current $i_{ECHOCANCEL}$ that passes through the circuit branch comprising resistor 330 with value R3 and variable capacitor 360 with value C1 and variable resistor 340 with value R4 may be modeled with the equation:

$$i_{ECHOCANCEL}=(1/(R3+R4))\ (1/[1+s(C1)(R3R4)/(R3+R4)]) \quad (4)$$

where the terms R3, R4, C1, and s have the previously described definitions. As previously described, variable capacitor C1 and variable resistor R4 are tuned to values that cause $i_{ECHOCANCEL}$ to be equal to $i_{ECHO}$ in magnitude but pi ($\pi$) radians (or 180°) out of phase.

Figure 6:
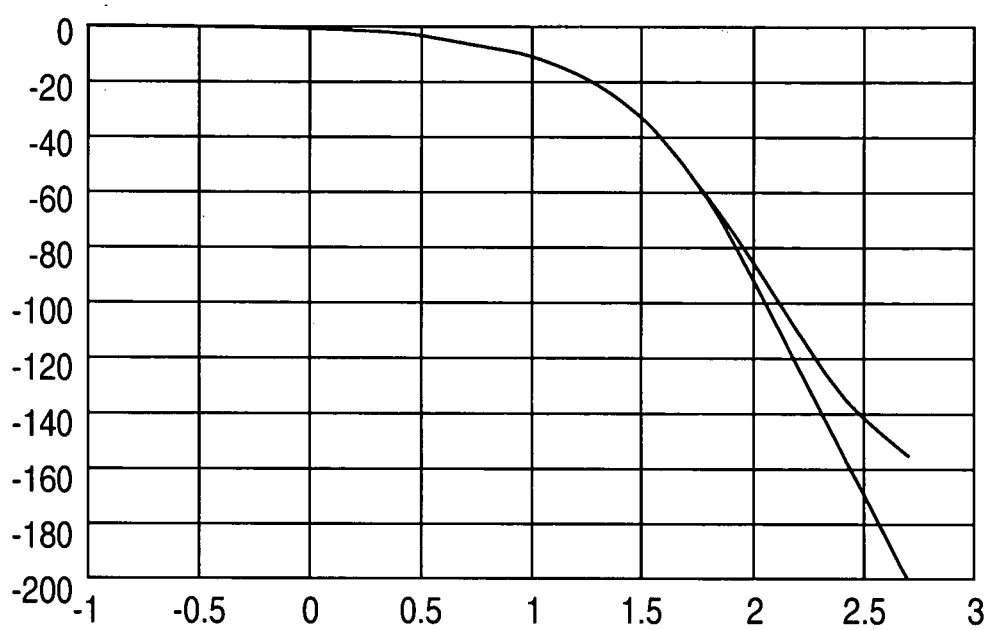
FIG. 6 is a graph that shows the values of the magnitude of the echo current and the values of magnitude of the echo canceller current as a function of frequency.

As an illustrative example, FIG. 6 shows the values of the magnitude of echo current $i_{ECHO}$ and the values of magnitude of echo canceller current $i_{ECHOCANCEL}$ as a function of frequency for the following values: $f_0$ equals the frequency, $R_{CABLE}$ equals one hundred ohms (100Ω), Rs equals one hundred fifty ohms (150Ω), R1 equals two thousand ohms (2000Ω), Cesd equals ten picofarads (10 pF), R3 equals five hundred ohms (500Ω), R4 equals three thousand eight hundred fifty (3850Ω), and C1 equals 3.3 picofarads (3.3 pF). The values of the impedances Zi and Zx are calculated as previously described.

In FIG. 6 the ordinate of the graph is in units of $20\log_{10}$ (absolute value of current). That is, the ordinate is $20\log_{10}$ ($|i_{ECHO}|$) or $20\log_{10}$ ($|i_{ECHOCANCEL}|$). The ordinate values range from minus two hundred (−200) to zero (0). The abscissa of the graph is in units of $\log_{10}$ ($f_0/10^6$) and the value ranges from minus one (−1) to three (3) representing a frequency range of 100 kilohertz (100 kHz) to one Gigahertz (1 GHz). The graph in FIG. 6 shows that the echo current $i_{ECHO}$ and the echo canceller current $i_{ECHOCANCEL}$ have the same magnitude through a wide range of frequencies. The magnitudes of the two currents only begin to differ significantly when the frequency exceeds one hundred Megahertz (100 MHz) where $\log_{10}$ ($f_0/10^6$) equals two (2).

The amount of uncancelled echo that appears at the output of low pass filter 260 may be modeled with the equation:

$$\text{UNCANCELLED ECHO}=(i_{ECHO}-i_{ECHOCANCEL})(R2)(1(1+s/fp)) \quad (5)$$

where R2 represents resistor 270 that is coupled in parallel with line receiver 225, and s equals j (the imaginary unit that is equal to the square root of minus one) times $\omega_0$ (the frequency in radians). The term fp represents the pole of low pass filter 260.

Figure 7:
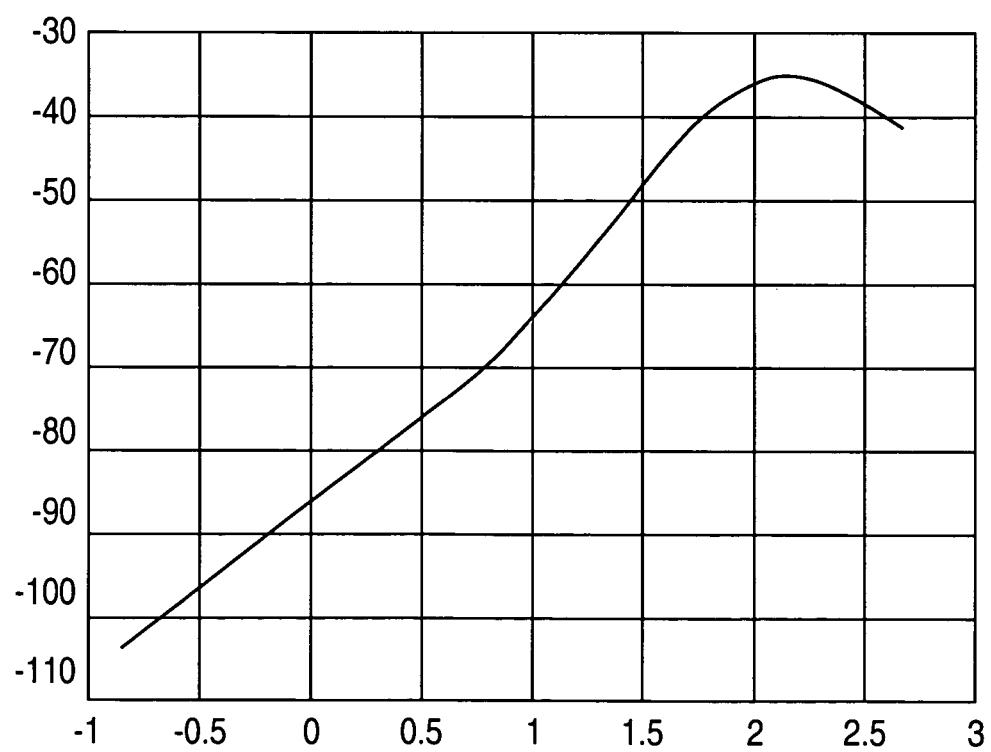
FIG. 7 is a graph that shows the values of the magnitude of the echo rejection of the echo canceller as a function of frequency.

As an illustrative example, FIG. 7 shows the values of the magnitude of the echo rejection of echo canceller 130 as a function of frequency for the following values: $f_0$ equals the frequency, R2 equals two thousand ohms (2000Ω), and fp equals $2\pi$ times 100 times $10^6$.

In FIG. 7 the ordinate of the graph is in units of $20\log_{10}$ (absolute value of uncancelled echo). That is, the ordinate is $20\log_{10}$ ($|\text{UNCANCELLED ECHO}|$). The ordinate values range from minus one hundred ten (−110) to minus thirty (−30). The abscissa of the graph is in units of $\log_{10}$ ($f_0/10^6$) and the value ranges from minus one (−1) to three (3) representing a frequency range of 100 kilohertz (100 kHz) to one Gigahertz (1 GHz). The graph in FIG. 7 shows that the uncancelled echo reaches a maximum value at a frequency equal to approximately one hundred fifty eight Megahertz (158.0 MHz) where $\log_{10}$ ($f_0/10^6$) equals approximately two (2.2).

Figure 8:
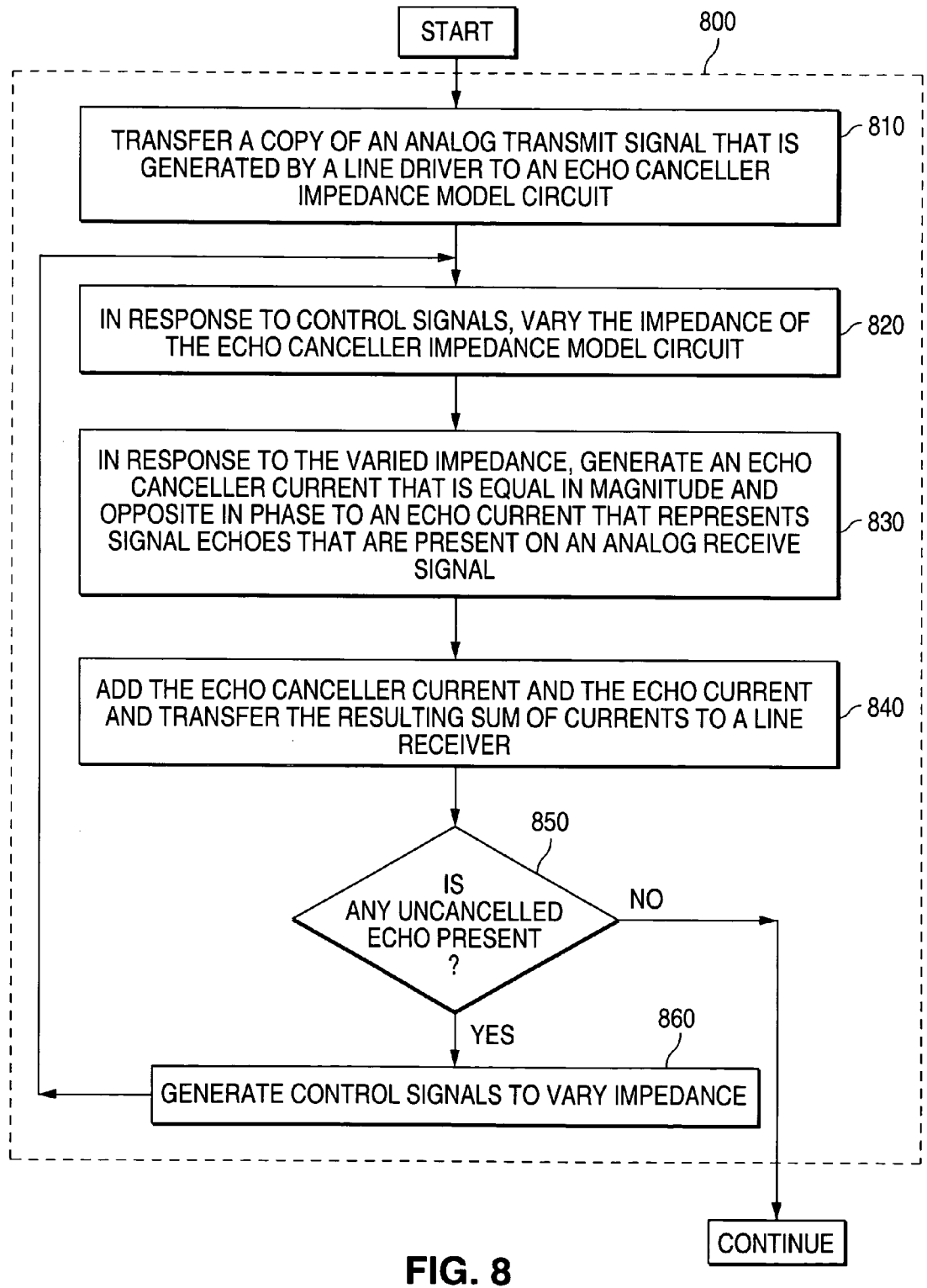
FIG. 8 is a flow diagram illustrating the operation of an exemplary full duplex transceiver according to one embodiment of the echo canceller of the present invention.

FIG. 8 depicts flow diagram 800, which illustrates the operation of exemplary full duplex transceiver 100 according to one embodiment of echo canceller 130 of the present invention. The operation steps of the method of the present invention are collectively referred to in FIG. 8 as operation steps 800. The first operation step 810 comprises transferring a copy of an analog transmit signal that is generated by line driver 120 to echo canceller impedance model circuit 290.

The second operation step 820 comprises varying the impedance of echo canceller impedance model circuit 290 in response to control signals from echo canceller control circuit 165. The third operation step 830 comprises generating an echo canceller current in response to the varied impedance of canceller impedance model circuit 290. The echo canceller is equal in magnitude and opposite in phase to an echo current that represents signal echoes that are present on an analog receive signal.

The fourth operation step 840 comprises adding the echo canceller current and the echo current and transferring the resulting sum of the currents to line receiver 225. The fifth operation step 840 comprises the step of determining whether any uncancelled echo is present in the analog receive signal after the echo canceller current and the echo current have been summed.

If there is no uncancelled echo present, then the next step of the method is to continue. If there is uncancelled echo present, then the next step of the method is sixth operation step 860. Sixth operation step 860 generates control signals to vary the impedance of echo canceller impedance model circuit 290 to compensate for the uncancelled echo. The next step of the method is second operation 820 that varies the impedance in response to the new control signals from operation step 860.

Echo canceller 130 of the present invention provides high performance echo cancellation. In some types of full duplex transceivers echo canceller 130 has proven capable of providing from eighteen (18) to twenty (20) decibels (dB) of echo rejection.

Echo canceller 130 provides such echo cancellation using only two (2) degrees of freedom in tuning. The first degree of freedom is that provided by the variable resistors, 320 and 340, and the second degree of freedom of tuning is provided by the variable capacitors, 350 and 360. The tuning of the resistors adjusts echo canceller current $i_{ECHOCANCEL}$ to compensate for the direct current variations in the characteristic impedance of cable 105. The tuning of the capacitors adjusts the echo canceller current $i_{ECHOCANCEL}$ to compensate for changes in the effective bandwidth of the echo path. The changes in the effective bandwidth of the echo path are due to variations in the impedance of transformer 110, variations in the capacitance of the electrostatic discharge protection capacitors, and variations in board capacitance.

The path of the echo current $i_{ECHO}$ and the path of the echo canceller current $i_{ECHOCANCEL}$ are the shortest possible paths. In addition, these paths do not contain any active elements. Mismatches in these two paths can lead to residual uncancelled echo. Mismatches in these two paths are minimized due the absence of active elements in these paths. This configuration provides a very robust manufacturing design that is generally insensitive to process offsets.

Echo canceller 130 of the present invention is easy to adapt. A pole has been placed in the path of echo current $i_{ECHO}$ to damp out the zero (peaking) in the z11 of transformer 110. This allows the echo canceller 130 to be implemented as single pole response. Adapting a single pole response is much easier than adapting a zero and a few poles to implement a bandpass response.

Low pass filter 260 at the end of echo canceller 130 attenuates uncancelled high frequency echo. Uncancelled high frequency echo is usually due to the difference between the echo current $i_{ECHO}$ and echo canceller current $i_{ECHOCANCEL}$ that occur at high frequencies that is primarily caused by the z11 peaking of transformer 110 at the higher frequencies. Some of the uncancelled high frequency echo may be due to mismatches between the magnitudes of the echo current $i_{ECHO}$ and echo canceller current $i_{ECHOCANCEL}$.

Although the present invention has been described in detail, those skilled in the art should understand that they can make various changes, substitutions and alterations herein without departing from the spirit and scope of the invention in its broadest form.

What is claimed is:

1. For use in a full duplex transceiver comprising a line driver capable of sending analog transmit signals through a cable and a line receiver capable of receiving analog receive signals from said cable, a system for cancelling echoes of said analog transmit signals that are present in said analog receive signals, wherein said system comprises:
   an echo canceller impedance model circuit coupled to the output of said line driver and coupled to the input of said line receiver, wherein said echo canceller impedance model circuit generates an echo canceller current that is substantially equal in magnitude and substantially opposite in phase to a current that represents said signal echoes; and
   wherein said echo canceller impedance model circuit generates said echo canceller current by iteratively generating control signals to vary a value of a variable impedance of said echo canceller model circuit until a generated value of said echo canceller current substantially cancels said signal echoes; and
   wherein said echo canceller impedance model circuit comprises at least one digital to analog converter that provides at least one control signal that varies a value of said variable impedance of said echo canceller impedance model circuit.

2. The system as claimed in Claim 1 wherein said echo canceller impedance model circuit has a variable impedance for generating a range of values of said echo canceller current.

3. The system as claimed in claim 2 wherein said variable impedance of said echo canceller impedance model circuit has at least two degrees of freedom.

4. The system as claimed in claim 3 wherein one of said at least two degrees of freedom of said variable impedance is provided by a variable resistance.

5. The system as claimed in claim 3 wherein one of said at least two degrees of freedom of said variable impedance is provided by a variable capacitance.

6. The system as claimed in claim 2 wherein said echo canceller impedance model circuit comprises a resistive digital to analog converter capable of varying the value of the resistance of at least one variable resistor to change the value of impedance in said echo canceller impedance model circuit.

7. The system as claimed in claim 2 wherein said echo canceller impedance model circuit comprises a capacitive digital to analog converter capable of varying the value of the capacitance of at least one variable capacitor to change the value of impedance in said echo canceller impedance model circuit.

8. A full duplex transceiver comprising:
   a line driver capable of sending analog transmit signals through a cable;
   a line receiver capable of receiving analog receive signals from said cable; and
   a system for cancelling echoes of said analog transmit signals that are present in said analog receive signals comprising:
      an echo canceller impedance model circuit coupled to the output of said line driver and coupled to the input of said line receiver, wherein said echo canceller impedance model circuit generates an echo canceller current that is substantially equal in magnitude and substantially opposite in phase to a current that represents said signal echoes; and
      wherein said echo canceller impedance model circuit generates said echo canceller current by iteratively generating control signals to vary a value of a variable impedance of said echo canceller model circuit until a generated value of said echo canceller current substantially cancels said signal echoes; and
      wherein said echo canceller impedance model circuit comprises at least one digital to analog converter that provides at least one control signal that varies a value of said variable impedance of said echo canceller impedance model circuit.

9. A full duplex transceiver as claimed in claim 8 wherein said echo canceller impedance model circuit has a variable impedance for generating a range of values of said echo canceller current.

10. A full duplex transceiver as claimed in claim 9 wherein said variable impedance of said echo canceller impedance model circuit has at least two degrees of freedom.

11. A full duplex transceiver as claimed in claim 10 wherein one of said at least two degrees of freedom of said variable impedance is provided by a variable resistance.

12. A full duplex transceiver as claimed in claim 10 wherein one of said at least two degrees of freedom of said variable impedance is provided by a variable capacitance.

13. A full duplex transceiver as claimed in claim 9 wherein said echo canceller impedance model circuit comprises a resistive digital to analog converter capable of varying the value of the resistance of at least one variable resistor to change the value of impedance in said echo canceller impedance model circuit.

14. A full duplex transceiver as claimed in claim 9 wherein said echo canceller impedance model circuit comprises a capacitive digital to analog converter capable of varying the value of the capacitance of at least one variable capacitor to change the value of impedance in said echo canceller impedance model circuit.

15. For use in a full duplex transceiver comprising a line driver capable of sending analog transmit signals through a cable and a line receiver capable of receiving analog receive signals from said cable, a method of cancelling echoes of said analog transmit signals that are present in said analog receive signals comprising the steps of:
   transferring a copy of an analog transmit signal from said line driver to an echo canceller impedance model circuit;
   iteratively generating control signals to vary a value of a variable impedance of said echo canceller model circuit;

wherein said iterative generation of said control signals comprises at least one control signal from at least one digital to analog converter in said echo canceller impedance model circuit;

generating an echo canceller current in response to the varied impedance of said echo canceller impedance model circuit where said echo canceller current is substantially equal in magnitude and substantially opposite in phase to an echo current that represents signal echoes that are present in said analog receive signals; and adding said echo canceller current from said echo canceller impedance model circuit to said echo current.

16. The method as claimed in claim 15 further comprising the steps of:

determining whether any uncancelled echo is present in said analog receive signals after said echo canceller current from said echo canceller impedance model circuit has been added to said echo current;

in response to a determination that uncancelled echo is present, generating control signals to vary the impedance of echo canceller impedance model circuit to cancel said uncancelled echo; and in response to said control signals, varying the impedance of said echo canceller impedance model circuit to cancel said uncancelled echo.

17. The method as claimed in claim 16 where the step of varying the impedance of said echo canceller impedance model circuit comprises:

varying the value of resistance of at least one variable resistor in said echo canceller impedance model circuit.

18. The method as claimed in claim 16 where the step of varying the impedance of said echo canceller impedance model circuit comprises:

varying the value of capacitance of at least one variable capacitor in said echo canceller impedance model circuit.

19. The method as claimed in claim 17 where the step of varying the value of resistance of at least one variable resistor in said echo canceller impedance model circuit comprises:

sending control signals to a resistive digital to analog converter within said echo canceller impedance model circuit to vary said value of resistance of said at least one variable resistor.

20. The method as claimed in claim 18 where the step of varying the value of capacitance of at least one variable capacitor in said echo canceller impedance model circuit comprises:

sending control signals to a capacitative digital to analog converter within said echo canceller impedance model circuit to vary said value of capacitance of said at least one variable capacitor.

21. For use in a full duplex transceiver comprising a line driver capable of sending analog transmit signals through a cable and a line receiver capable of receiving analog receive signals from said cable, a system for cancelling echoes of said analog transmit signals that are present in said analog receive signals, wherein said system comprises:

an echo canceller impedance model circuit coupled to the output of said line driver and coupled to the input of said line receiver, wherein said echo canceller impedance model circuit generates an echo canceller current that is substantially equal in magnitude and substantially opposite in phase to a current that represents said signal echoes; and wherein said echo canceller impedance model circuit generates said echo canceller current by iteratively generating control signals to vary a value of a variable impedance of said echo canceller model circuit until a generated value of said echo canceller current substantially cancels said signal echoes;

wherein said echo canceller impedance model circuit comprises a resistive digital to analog converter capable of varying a value of a resistance of at least one variable resistor to change a value of impedance in said echo canceller impedance model circuit; and wherein said echo canceller impedance model circuit comprises a capacitive digital to analog converter capable of varying a value of a capacitance of at least one variable capacitor to change a value of impedance in said echo canceller impedance model circuit.

22. For use in a full duplex transceiver comprising a line driver capable of sending analog transmit signals through a cable and a line receiver capable of receiving analog receive signals from said cable, a method of cancelling echoes of said analog transmit signals that are present in said analog receive signals comprising the steps of:

transferring a copy of an analog transmit signal from said line driver to an echo canceller impedance model circuit;

iteratively generating control signals to vary a value of a variable impedance of said echo canceller model circuit;

generating an echo canceller current in response to the varied impedance of said echo canceller impedance model circuit where said echo canceller current is substantially equal in magnitude and substantially opposite in phase to an echo current that represents signal echoes that are present in said analog receive signals; and adding said echo canceller current from said echo canceller impedance model circuit to said echo current;

determining whether any uncancelled echo is present in said analog receive signals after said echo canceller current from said echo canceller impedance model circuit has been added to said echo current;

in response to a determination that uncancelled echo is present, generating control signals to vary the impedance of echo canceller impedance model circuit to cancel said uncancelled echo; and in response to said control signals, sending control signals to a resistive digital to analog converter within said echo canceller impedance model circuit to vary a value of resistance of at least one variable resistor to vary an impedance of said echo canceller impedance model circuit; and in response to said control signals, sending control signals to a capacitative digital to analog converter within said echo canceller impedance model circuit to vary a value of capacitance of at least one variable capacitance to vary an impedance of said echo canceller impedance model circuit.

* * * * *

UNITED STATES PATENT AND TRADEMARK OFFICE
CERTIFICATE OF CORRECTION

PATENT NO. : 7,139,342 B1 Page 1 of 1
APPLICATION NO. : 09/569957
DATED : November 21, 2006
INVENTOR(S) : Abhijit M. Phanse It is certified that error appears in the above-identified patent and that said Letters Patent is hereby corrected as shown below:

Column 10, line 4, delete "$(f_0/106)$" and replace with -- $(f_0/10^6)$ --.

Signed and Sealed this

Sixth Day of November, 2007

JON W. DUDAS
*Director of the United States Patent and Trademark Office*